April 15, 1924.

R. F. DICKMAN 1,490,161

ARTIFICIAL FISH BAIT

Filed April 7, 1923

R. F. Dickman,
Inventor

By C. A. Snow & Co.
Attorneys

Patented Apr. 15, 1924.

1,490,161

UNITED STATES PATENT OFFICE.

RICHARD F. DICKMAN, OF BRISTOL, INDIANA.

ARTIFICIAL FISH BAIT.

Application filed April 7, 1923. Serial No. 630,548.

*To all whom it may concern:*

Be it known that I, RICHARD F. DICKMAN, a citizen of the United States, residing at Bristol, in the county of Elkhart and State of Indiana, have invented a new and useful Artificial Fish Bait, of which the following is a specification.

This invention relates to fishing tackle and more particularly to artificial fish bait.

The object of the invention is to provide a bait of this character equipped with a plurality of hooks extending in various directions from different sides, all connected by a single wire, the wire constituting attaching means for the line.

Another object is to provide a bait of this character constructed with a spoon head so located as to cause the bait to twirl or zig-zag through the water.

With the foregoing and other objects in view which will appear as the description proceeds, the invention resides in the combination and arrangement of parts and in details of construction hereinafter described and claimed, it being understood that changes in the precise embodiment of the invention herein disclosed may be made within the scope of what is claimed without departing from the spirit of the invention.

In the accompanying drawings:—

Figure 1:
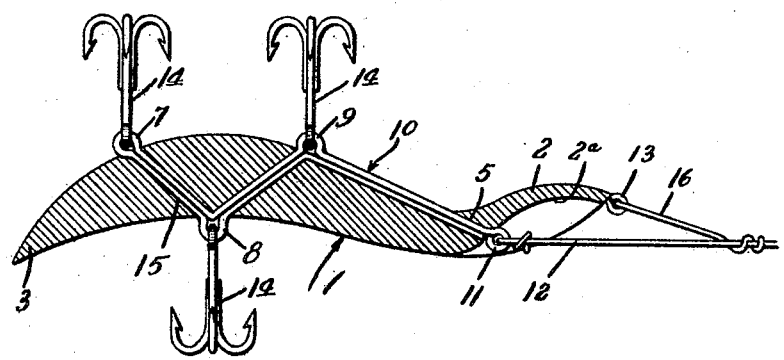
Figure 2:
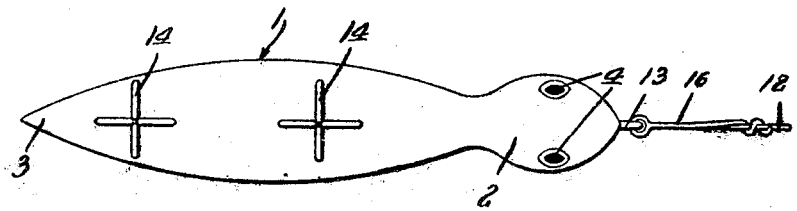

Figure 1 represents a longitudinal section through the bait constituting this invention, and Fig. 2 is a top plan view thereof.

In the embodiment illustrated, the bait constituting this invention comprises a body 1 composed of any suitable material shaped as shown in the form of a compound curve, the head 2 of which is made spoon shaped with the convex face of the bowl extending upwardly while the tail 3 extends downwardly.

The head 2 having a concave lower face 2ª is equipped with imitation eyes 4 and a bore 5 extends obliquely through the rear portion of the head toward the body and which is designed to receive a hook connector 10 preferably in the form of a folded piece of copper wire which is threaded through a V-shaped bore 15 extending transversely through the body 1 from the back to the belly of the bait. This wire is provided with a plurality of eyes 7, 8 and 9 designed to receive hooks 14, three of which are here shown. The front end of the wire 10 has an eye 11 arranged at the base of the head 2 on its lower face and with which is connected one end of the fishing line 12. Another eye 13 is located at the extreme front end of the head 2 and has a line 16 connected therewith which merges into and is connected with line 12. This line 16 is designed to prevent the head from catching rubbish during its passage through the water.

A bait constructed as herein shown and described, when drawn through the water, will follow a zig-zag or serpentine course imitating a craw fish or crab in its travel through the water.

The body of the bait may be decorated in any suitable or desired manner to attract the fish.

Various changes in the form, shape, proportion and other minor details of construction may be made without departing from the spirit or sacrificing any of the advantages of the claimed invention.

I claim:—

1. A bait of the class described comprising a body member having an upstanding head and a down-turned tail, the head having a spoon-shaped recess on its lower face and lines secured to the base of the lower face of the head and to the extreme front end thereof, said bait having hooks carried thereby.

2. A bait of the class described comprising a body in the form of a compound curve with a bore extending in zig-zag direction therethrough and zig-zagging from top to the bottom of the bait, a spoon-shaped head mounted on said body with said bore opening from the base of said head on its lower face, an eye mounted in said bore on the lower face of the head, a line connected with said eye, another line connected with the extreme front end of the head and merging into said first mentioned line, a hook connector extending through said bore and having hooks attached thereto.

In testimony that I claim the foregoing as my own, I have hereto affixed my signature in the presence of two witnesses.

RICHARD F. DICKMAN.

Witnesses:
R. A. CARMIN,
E. B. APP.